United States Patent [19]
Roszyk et al.

[11] 3,840,795
[45] Oct. 8, 1974

[54] HAND HELD BATTERY OPERATED DEVICE AND CHARGING MEANS THEREFOR

[75] Inventors: Leon M. Roszyk, Berwyn; Louis A. Barnas, Jr., Cary, both of Ill.

[73] Assignee: Sunbeam Corporation, Chicago, Ill.

[22] Filed: Jan. 21, 1970

[21] Appl. No.: 4,712

Related U.S. Application Data

[63] Continuation of Ser. No. 380,839, July 7, 1964.

[52] U.S. Cl. ................................. 320/2, 320/57
[51] Int. Cl. ...................................... H02j 7/00
[58] Field of Search ....... 320/2, 53, 57, 59; 336/83, 336/86, 87, 90, 96, 119, 136, 182; 310/47, 50

[56] References Cited
UNITED STATES PATENTS

| | | | |
|---|---|---|---|
| 2,415,688 | 2/1947 | Hall, Jr. ............................ | 219/25 |
| 2,967,267 | 1/1961 | Steinman et al. ................. | 317/101 |
| 3,142,852 | 8/1964 | Phaneuf ........................... | 320/2 |
| 3,143,697 | 8/1964 | Springer .......................... | 320/2 |
| 3,145,404 | 8/1964 | Fielden ............................ | 320/2 |
| 3,277,358 | 10/1966 | Nicholl ............................ | 320/2 |
| 3,329,880 | 7/1967 | Boyles ............................. | 320/2 |
| 3,418,552 | 12/1968 | Holmes ............................ | 320/2 |
| 3,510,747 | 5/1970 | Petrides .......................... | 320/57 |

*Primary Examiner*—William M. Shoop, Jr.
*Attorney, Agent, or Firm*—George R. Clark, Esquire

[57] ABSTRACT

A battery operated appliance comprising a power unit having a rechargeable battery therein and a charging unit having a recess for insertion of the power unit therein for recharging the battery within the power unit, a transformer including one winding in the power unit and one winding in the charging unit. In one embodiment the magnetic core structure associated with one of the windings is at least in part defined by the casing of the rechargable battery. Various core structures may be employed to ensure good inductive coupling between the respective windings.

5 Claims, 9 Drawing Figures

PATENTED OCT 8 1974  3,840,795

PATENTED OCT 8 1974 3,840,795

INVENTORS:
LOUIS A. BARNAS, Jr.
LEON M. ROSZYK

BY George R. Clark
ATT'Y

INVENTORS:
LOUIS A. BARNAS, Jr.
LEON M. ROSZYK

HAND HELD BATTERY OPERATED DEVICE AND CHARGING MEANS THEREFOR

The instant application is a continuation of the copending application of Leon M. Roszyk and Louis A. Barnas, Jr., Ser. No. 380,839, filed on July 7, 1964.

The present invention relates to a cordless electric appliance and more particularly to an appliance operated by a rechargeable battery and to a combination stand and charging unit therefor.

In a copending application of Albert R. Spohr, Ser. No. 353,327, filed Mar. 20, 1964, now U.S. Pat. No. 3,274,631, and assigned to the same assignee as the instant application, there is disclosed and claimed a cordless appliance and specifically a power driven toothbrush which comprises a battery operated power unit and a charging unit for receiving the power unit of the toothbrush when the latter is not in use and charging the rechargeable battery contained within such power unit. The power operated toothbrush and charging unit disclosed in the above-mentioned copending application has been extensively sold on the market and has been found to be very satisfactory.

In the above-mentioned copending Spohr application, the power unit is provided with a pair of electrical contacts brought outside a casing enclosing the power unit, which contacts are engageable with cooperating contacts in the charging unit to complete the charging circuit for the rechargeable battery. Since such an appliance is used with liquids, such as water and toothpaste in somewhat liquified form, these liquids occasionally run down along the appliance unit necessitating sealing of the casing where these charging contacts are brought out. Moreover, such liquid may also engage the cooperating contacts in the charging unit with deleterious effect. It would be desirable to eliminate such charging contacts entirely. In other words, it would be desirable to provide a means for completing the charging circuit of the rechargeable battery when the power unit is not in use without the use of any electrical contacts to complete this circuit.

Accordingly, it is an object of the present invention to provide a new and improved electric battery operated appliance including a hand held power unit and a charging unit for recharging the battery in the hand held power unit, wherein electrical contacts for electrically interconnecting the power unit and the charging unit are completely eliminated.

It is another object of the present invention to provide a cordless, contactless battery operated toothbrush and charging unit therefor.

It is another object of the present invention to provide a cordless, contactless battery operated toothbrush which is light in weight, compact in size, foolproof in operation and lends itself to mass production manufacturing techniques.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings wherein.

Briefly, the electric cordless, contactless toothbrush of the present invention includes a compact hand held power unit adapted to be stored in a charging and support unit which is also adapted to hold several toothbrush attachments for use with the power unit. The power unit includes a rechargeable battery and a rotary electric motor adapted to be driven thereby. It also includes the secondary winding of a transformer, the primary winding of which is associated with the charging unit. The appliance of the present invention includes improved and novel inductive coupling means for inductively coupling the charging unit and power unit so that the power unit casing may be completely sealed without the necessity of any charging unit contacts. Moreover, this must be accomplished without substantially increasing the size or weight of the power unit. The power unit also includes a rectifier to convert the low voltage alternating current from the secondary winding of the transformer to direct current for charging a low voltage rechargeable battery. In one embodiment the battery casing forms a part of the inductive coupling and in other embodiments various modifications of inductive coupling means are provided.

Figure 1:
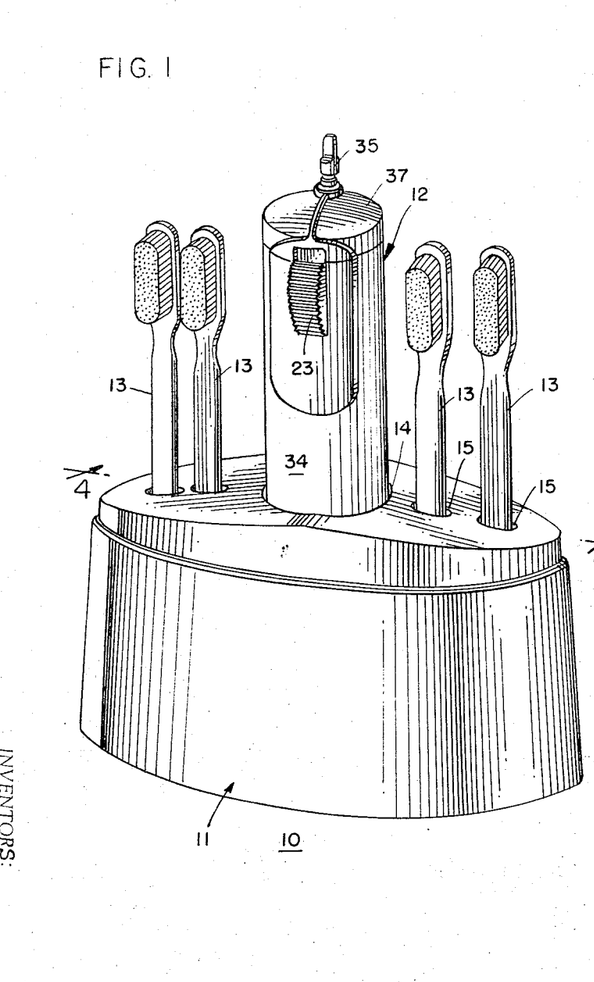
FIG. 1 is a perspective view of the improved battery operated appliance of the present invention showing the combined support and charging unit with the power unit in the position it assumes for the recharging of the battery included in the power unit.
Figure 4:
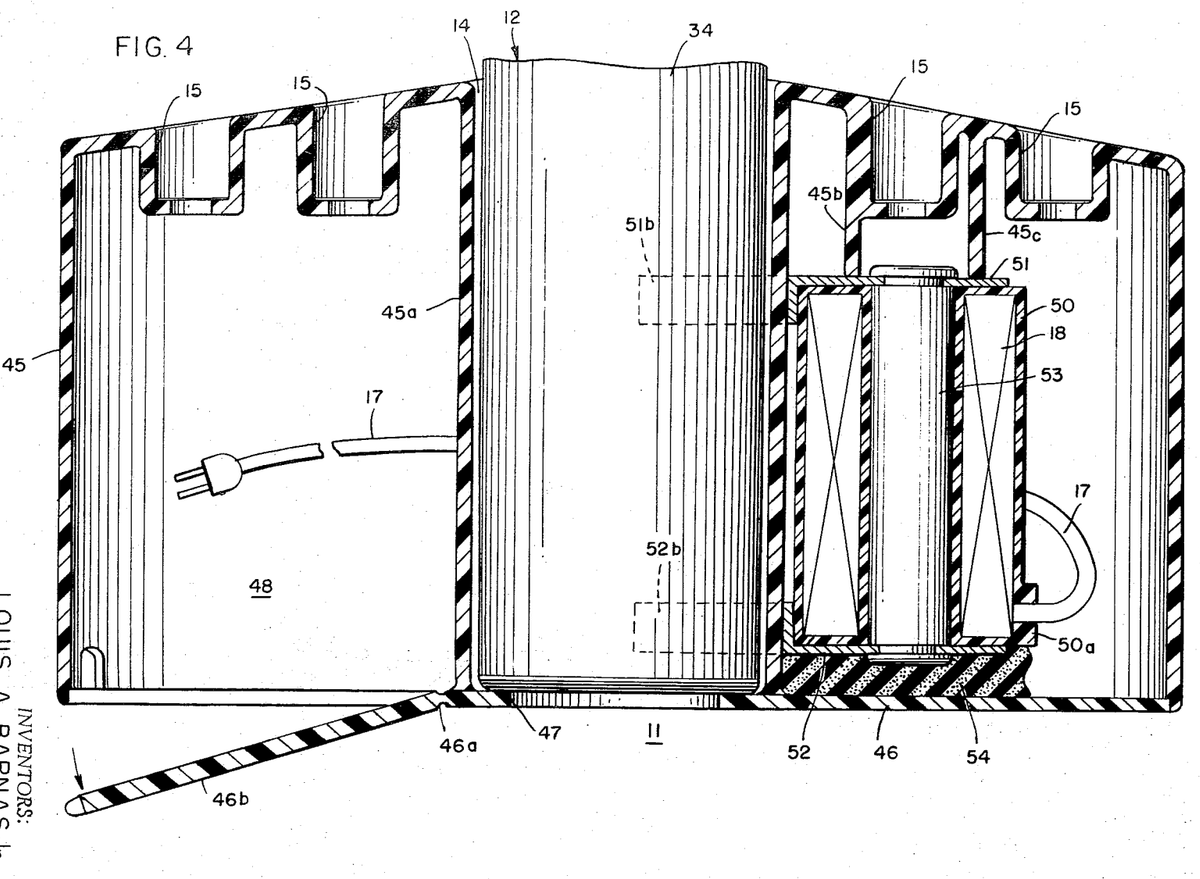
FIG. 4 is an enlarged sectional view of the charging and support unit taken substantially on line 4—4 of FIG. 1 with the power unit shown disposed in charging position but with the toothbrush attachments removed.
Figure 5:
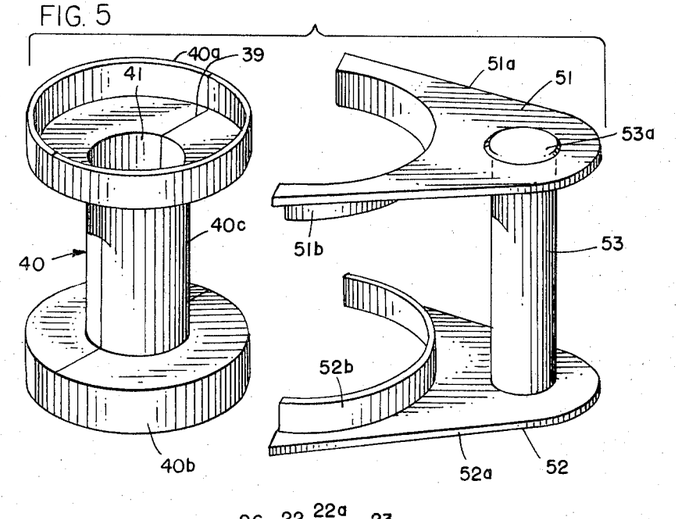
FIG. 5 is an exploded perspective view of magnetic core structures employed in the power unit and charging unit, respectively, to show the relationship of these parts during a battery charging operation.
Figure 6:
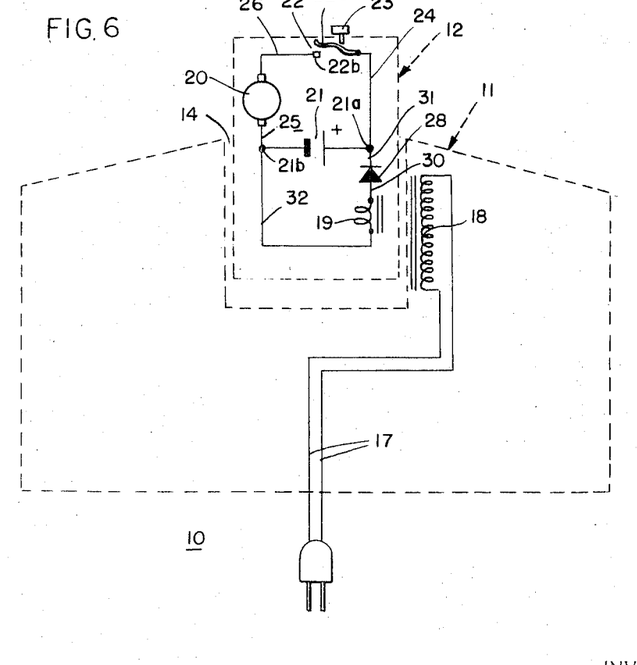
FIG. 6 is a schematic diagram illustrating the electric circuit of the appliance of the present invention with the units in the relationship of FIG. 1 and with the charging unit and power unit shown in diagrammatic form.

Referring now to FIGS. 1 to 6 of the drawings which disclose what at present is believed to be the preferred embodiment of the present invention, there is illustrated a cordless electric appliance generally designated in FIGS. 1 and 6 by the reference numeral 10. This cordless, contactless battery operated electric toothbrush 10 comprises a combined charging and storage unit 11, a hand held power unit 12 and a plurality of toothbrush attachments 13, shown in FIG. 1 as disposed in the storage and charging positions. The storage and charging unit 11, described in greater detail hereinafter, is preferably provided with means defining a recess 14 for receiving the power unit 12 during a charging operation thereof. It is also provided with a plurality of recesses 15 for receiving and storing the brush attachments 13 when not in use. If desired, the storage and charging unit 11 may be provided with a suitable cover, not shown, such as disclosed in the copending Spohr application referred to above, which acts as a dust protector and yet will permit the desired air circulation for the drying of any moisture associated with the power unit 12 and the stored brush attachments 13.

The present invention is concerned primarily with the particular arrangement of certain components within the power unit 12 and within the charging and storage unit 11 to eliminate the necessity of any electrical contacts to render the charging operation effective. Accordingly, the construction of the brush attachments 13 and the particular construction of other facets of the power unit 12 and the combined storage and charging unit 11 form no part of the present invention and, hence, will only very briefly be described. They, however, may be very similar or identical with those disclosed in the copending Spohr application referred to above.

Before considering the details of the present invention, reference should be had to the schematic diagram of FIG. 6 of the drawings illustrating the essential components of the battery operated appliance of the present invention. The charging and storage unit 11 is schematically illustrated with the recess 14 for the power unit 12. The latter is also schematically illustrated as being disposed within this recess 14 for recharging of the battery thereof. The combined storage and charging unit 11 is illustrated as being provided with the conventional power cord 17 connected to a primary winding 18 of a suitable step-down transformer, the latter also including a secondary winding 19 disposed within the power unit 12. When the power unit 12 is in the recess 14, the windings 18 and 19 are inductively coupled, as schematically illustrated in FIG. 6. Also included within the power unit 12 is a low voltage direct current electric motor 20 connected to a rechargeable battery 21 through a switch 22 having a movable contact 22a and a stationary contact 22b. Manual means 23 for actuating the switch 22 is schematically indicated by the reference numeral 23. As illustrated, the positive terminal 21a of the battery 21 is connected through a suitable conductor 24 to the movable switch contact 22a. Similarly, negative terminal 21b of the rechargeable battery 21 is connected by a suitable conductor 25 to one terminal of the motor 20. The other terminal of the motor 20 is illustrated as being connected through a conductor 26 with the stationary switch contact 22b. It will be obvious that when the switch 22 is closed motor 20 will be energized from the battery 21.

To recharge the battery 21 there is provided in the power unit 12 (FIG. 6) a charging circuit comprising the secondary winding 19 and a diode 28 for rectifying the low voltage alternating current output of this winding. As illustrated, one terminal of the secondary winding 19 is connected by a conductor 30 with one terminal of the diode 28, and the other terminal of the diode 28 is connected by a conductor 31 with the positive terminal 21a of the battery 21. The other terminal of the secondary winding 19 is connected by a conductor 32 with the negative terminal 21b of the battery 21. It will be appreciated that whenever inductive coupling between windings 18 and 19 is effected, battery 21 will tend to be recharged if power cord 17 is connected to a suitable source of alternating current energy.

In a device incorporating the present invention, motor 20 was a rotary direct current motor having a voltage rating of between one and one and one-half volts, the battery 21 was a nickel cadmium rechargeable battery having a voltage rating of the order of one and two-tenths volts, and the primary winding 18 comprised 7,200 turns while the secondary winding 19 comprised between 600 and 650 turns, thus resulting in a voltage reduction from 120 volts A.C. to approximately one and four-tenths volts D.C.

Figure 2:
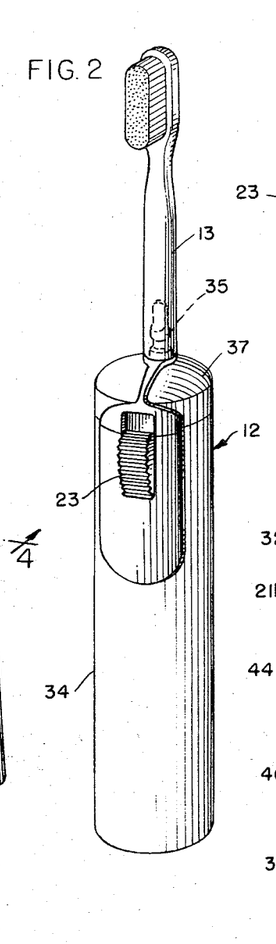
FIG. 2 is a perspective view of the hand held power unit of FIG. 1 removed from the support and charging unit and shown in association with a toothbrush attachment so as to be ready for a brushing operation.
Figure 3:
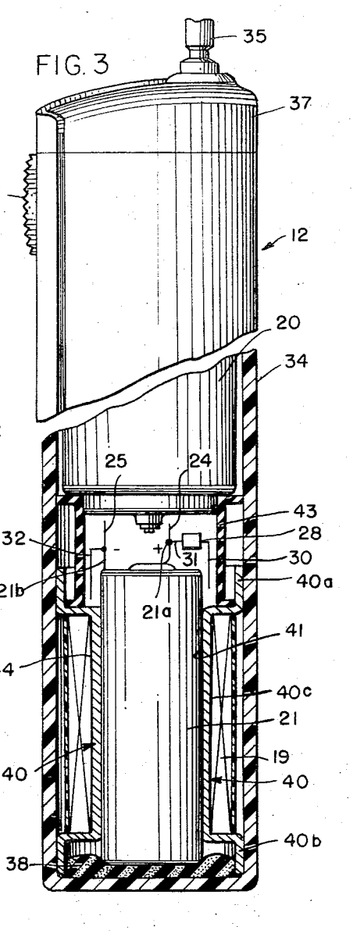
FIG. 3 is an enlarged partly sectional and partly schematic view of the power unit of FIG. 2 in order better to illustrate the features of the present invention.

Referring further to FIGS. 1 to 6 of the drawings, wherein the corresponding parts are designated by the same reference numerals, the power unit 12 is illustrated as comprising a molded plastic housing 34 closed at the bottom, as clearly shown in FIG. 3 of the drawings. This housing or casing 34 is illustrated as having a generally cylindrical configuration so as to be readily receivable within the recess 14 of charging and storage unit 11. Preferably, the housing 34 has an outer diameter of somewhere between an inch and one-fourth and an inch and one-half, and a length of the order of five inches, whereby it may readily be manipulated by the user even if the user is a relatively small child. The upper end of the casing 34 (not shown) must be open in order that the secondary winding 19, the battery 21, the motor 20 and the switch 22 may be inserted therein.

The particular mounting arrangement of the switch 22 and the motor 20 within the casing 34 is preferably essentially that described in the above-mentioned Spohr application and forms no part of the present invention. However, the lower portion of the motor 20 is illustrated in FIG. 3 of the drawings. Preferably the motor 20, as in the aforementioned Spohr application, has associated therewith and secured thereto as a subassembly, a suitable mechanism support and drive mechanism for converting the rotary motion of the motor 20 to oscillating motion of an output shaft 35 (FIGS. 1, 2 and 3). Preferably also suitable means for supporting the switch 22 are provided near the upper open end of casing 34 and the switch actuating member 23 is illustrated in FIGS. 1, 2 and 3 as a slidable movable member whose function is to move contact 22a to the closed position to connect the terminals of motor 20 across the terminals of battery 21.

In view of the fact that a toothbrush is commonly used with toothpaste and water, it is important to seal the casing thereof against the entrance of moisture. Since the lower end of casing 34 has unbroken walls, it is obviously sealed against the entrance of moisture. The upper open end of casing 31 must also be sealed by suitable means, not shown, including means for sealing the place where the output shaft 35 emerges from casing 34. The particular sealing means for the upper end of casing 34 form no part of the present invention and they may be identical with those disclosed in the copending Spohr application mentioned above. To improve the appearance of the upper end of housing 34 by enclosing the means for securing the motor 20 and associated drive means as well as switch 22 within housing 34 and also the sealing means for output shaft 35, there is provided a closure cap 37 which preferably is of molded somewhat resilient plastic material including means for interlocking it with the casing 34 as a final assembly operation.

In accordance with the present invention, there is disposed in the bottom of casing 34 a resilient pad 38 (FIG. 3) which preferably may be made of polyurethane or other suitable cushioning means. Disposed immediately above the pad 38 in accordance with the present invention is the battery 21 and the secondary winding 19 in concentric relationship, as best shown in FIG. 3 of the drawings. In order that the winding 19 may readily be inductively coupled with the primary winding 18 in the charging unit 11, the former is wound on a suitable bobbin 40 formed of soft iron or similar material providing a low reluctance flux path, as best shown in FIG. 5 of the drawings. For ease of manufacture the bobbin 40 may be formed in two halves joined at a center line 39 (FIG. 5). Preferably the bobbin comprises a pair of spaced flanged pole pieces 40a and 40b interconnected by a tubular center portion 40c, the latter defining a battery chamber 41 (FIGS. 3 and 5) for receiving the battery 21. The spacing between secondary pole pieces 40a and 40b must coincide with the spacing between primary pole pieces described hereinafter. It will be appreciated that by concentrically positioning the battery 21 and winding 19 the length and diameter of casing 34 may be kept at a minimum.

In accordance with the present invention, the casing of the battery 21 defines a portion of the flux path between the secondary pole pieces 40a and 40b thereby to improve the inductive coupling between the windings 18 and 19, as will become apparent from the ensuing description. For maintaining the elements comprising power unit 12 properly positioned within the housing or casing 34, a flanged insulating sleeve 43 is preferably interposed between the motor 20 and the upper secondary pole piece 40a. The lower end of member 43 is illustrated as being received within the space defined by flanged upper pole piece 40a. To reduce weight, the secondary winding 19 preferably comprises an insulated aluminum wire, layer-wound on the portion 40c of bobbin 40, and the ends of this winding are brought out in any suitable manner, such as through openings (not shown) in the pole pieces 40a and 40b so as to permit electrical connection in a charging circuit in the manner shown in FIG. 6 of the drawings. To better insulate the secondary winding 19 from bobbin 40, a layer of insulating tape 44 may surround portion 40c. A similar layer 44 may also surround the completed winding 19. The physical details of the electrical connections between battery 21, motor 20 and winding 19 form no part of the present invention, and the electrical circuit is only schematically indicated in FIG. 3 of the drawings. The casing of battery 21 is ordinarily the negative terminal, and a central portion at one end (FIG. 3) usually defines the positive terminal. However, the diode 28 must be suitably mounted within the casing 34 either within sleeve 43, as shown in FIG. 3 of the drawings, or, if desired, within the space between the insulating sleeve 43 and the casing 34.

Considering now the combined storage and power unit 11 in more detail, particularly with reference to FIGS. 4, 5 and 6 of the drawings, it comprises a molded housing member 45, preferably molded of a suitable plastic, the housing being more or less closed at the top except for the recesses 14 and 15. The recess 14 is defined by an integral tubular portion 45a while the recesses 15 are defined by similar wall portions integrally formed with housing member 45. In FIG. 4 of the drawings the lower portion of the power unit 12 is shown disposed in the recess 14 in charging position. To determine the correct charging position, the lower open end of housing 45 including the tubular recess 14 defined by wall portion 45a is closed by a closure plate 46 suitably secured in position by means not shown in the drawings. The closure plate 46 is provided with an opening 47 beneath recess 14 of a diameter substantially less than the diameter of recess 14 whereby the edges of opening 47 define a stop for accurately positioning the power unit 12 when disposed in its charging position, shown in FIG. 4 of the drawings. Opening 47, of course, permits any liquid or other foreign matter entering recess 14 to exit therefrom. The space in housing member 45 surrounding the wall portion 45a defining recess 14 is generally designated as chamber 48, and this chamber is employed to house the primary winding 18 and the power cord 17. In order that the chamber 48 may comprise a storage chamber for the power cord, the cover 46 is provided with a thin wall section 46a effectively defining a hinge so that the section 46b defines a pivoted cover portion readily movable to the open position to afford access to the chamber 48.

In order that the primary winding 18, also disposed within the chamber 48, may be inductively coupled with the secondary winding 19 when the power unit 12 is disposed in charging position within the recess 14, the winding 18 wound as an annulus is preferably encapsulated in an epoxy resin or similar material providing a complete sealed enclosure therefor and designated by the reference number 50. Preferably this enclosure 50 includes an integral strain relief portion 50a encircling the power cord 17 where it enters the encapsulation. To provide the desired path for the primary flux, there is provided a pair of primary pole pieces 51 and 52, best shown in FIGS. 4 and 5 of the drawings, which are rigidly interconnected in spaced parallel relationship by a bobbin core 53 receivable in the annular encapsulated winding 18. The pole pieces 51 and 52 and the core 53 are formed of a material providing a low reluctance flux path. To assemble the core 53 with pole pieces 51 and 52, the former is provided with ends of reduced cross section received in suitable openings in the primary pole pieces, which ends are then peened over as indicated at 53a to provide a unitary core structure. In a preferred embodiment, the core 53 had an overall length of less than two inches. The pole pieces 51 and 52, as best shown in FIG. 5 of the drawings, comprise flat plates of low reluctance material designated as 51a and 52a, respectively, having bifurcated ends defined by laterally projecting semicircular flanges 51b and 52b, respectively. These semicircular flanges 51b and 52b have a radius such as to closely embrace the tubular portion 45a of the housing 45, as best shown in FIG. 4 of the drawings.

The spacing between the primary pole pieces 51 and 52 should be great enough so as to reduce flux leakage therebetween. As illustrated, the flanges 51b and 52b are directed toward each other, as best shown in FIGS. 4 and 5 of the drawings, and the spacing is such as to be the same as the spacing between the secondary pole pieces 40a and 40b, as is clearly shown in FIG. 5 of the drawings. It will be understood that when the power unit 12 is positioned in its charging position in recess 14 as shown in FIG. 4 of the drawings, the primary pole pieces 51 and 52, and particularly the flanges 51b and 52b thereof, will be in substantial alignment with the secondary pole pieces 40a and 40b. It will be understood that the flux produced by primary winding 18 will have a flux path comprising the primary pole pieces 51 and 52, and secondary pole pieces 40a and 40b of bobbin 40 which are interconnected by a cylindrical bobbin portion 40c and also in part by the casing of the battery 21.

For the purpose of holding the assembly comprising encapsulated primary winding 18 and its associated pole pieces 51 and 52 in the position shown in FIG. 4 of the drawings, the housing 45 is provided with a plurality of integral stop members, such as 45b and 45c, engaging the upper pole shoe 51. A resilient pad 54 is then interposed between the cover 46 and the lower pole shoe 52, as best shown in FIG. 4 of the drawings, the cover 46 holding these parts in the positional relationship shown.

In view of the description included above, the operation of the battery operated toothbrush, particularly with respect to the contactless charging arrangement, will readily be understood by those skilled in the art. The power unit 12 comprises a housing with continuous sealed walls as far as the lower portion thereof is concerned, and the secondary winding contained therein is inductively coupled with the primary winding 18 when the power unit 12 is inserted in the recess 14 so that recharging of the battery 21 can occur without the necessity of interengagement of any electrical contacts between the charging unit 11 and the power unit 12.

Figure 7:
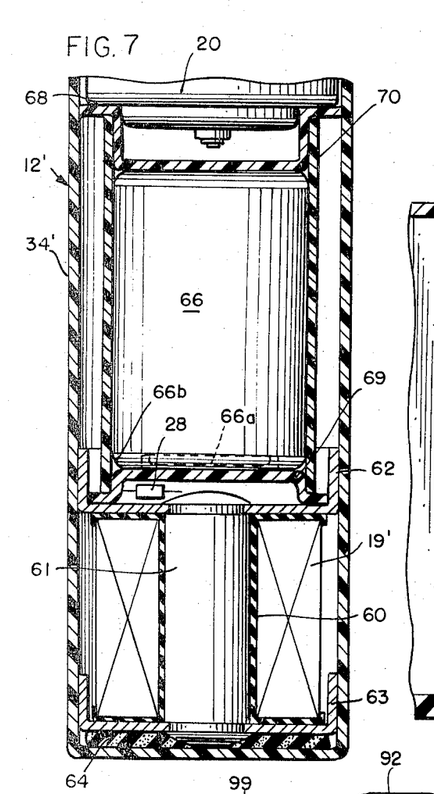
FIG. 7 is a fragmentary sectional view of a power unit illustrating a modification of the present invention.

It should be understood that although the arrangement described above is what is at present considered to be the preferred embodiment of the present invention, the battery 21 and secondary winding 19 need not be concentrically disposed within power unit 12, as shown in FIG. 3 of the drawings, if a short additional length of the power unit housing can be tolerated. In FIG. 7 of the drawings there is illustrated a fragmentary sectional view of the lower portion of a power unit illustrating a modification of the present invention. The modified power unit is generally designated as 12' and includes a casing 34' closed at the bottom in the same manner as casing 34 described above. The motor 20 is mounted in casing 34' in the same way as in the preceding embodiment. In accordance with the present invention and as illustrated in the drawings, the secondary winding designated as 19' is wound on an insulated bobbin 60 surrounding an iron core 61 which interconnects a pair of flanged secondary pole pieces or pole shoes 62 and 63. These pole pieces or pole shoes 62 and 63, like the core 61, are preferably formed of material providing a low reluctance flux path. The core 61 interconnects the secondary pole pieces 62 and 63 in much the same manner as the core 53 of FIGS. 4 and 5 interconnected the primary pole pieces 51 and 52. As illustrated, the pole pieces 62 and 63 are cup shaped and disposed with the circular flanges directed in the same direction so as to give the maximum spacing to prevent flux leakage and at the same time to give the shortest over-all length of the unit 12'. Preferably a cushioning pad 64 is disposed in the bottom of casing 34' engaging the lower pole piece 63 and a portion of the core 61.

In FIG. 7 of the drawings the rechargeable battery is designated by the reference numeral 66 and is illustrated as having its positive terminal 66a accessible at the lower end of the battery, and, of course, the battery casing defines the negative terminal which is designated as 66b. To properly position the battery within the casing 34 between the motor 20 and the secondary winding 19', a pair of cup-shaped insulating members 68 and 69 are employed, the member 68 being associated with the lower end of the motor 20, while the insulating member 69 is associated with the upper pole piece 62 and actually being disposed within the chamber defined by this pole piece, as clearly shown in FIG. 7 of the drawings. An insulating sleeve 70 snugly receives the battery 66 and engages the portions of reduced cross section of the flanged cup-shaped insulating members 68 and 69.

The diode 28 is indicated as being disposed in the space between the flanged cup-shaped member 69 and the upper pole piece 62. However, it could also be disposed in the space between the sleeve 70 and casing 34'. The electrical connections will be identical with those shown in FIG. 6 of drawings, and the same charging and storage unit 11 may be employed, the important criteria being that the spacing between the flanges 51b and 52b of the primary pole pieces be substantially identical with the spacing between the secondary pole pieces 62 and 63 so that when the power unit 12' is disposed in the recess 14 in charging position the magnetic coupling between windings 18 and 19' is at a maximum. To reduce the weight the winding 19' preferably should be formed of insulated aluminum wire.

In view of the description included above, the construction, assembly and operation of the power unit 12' will readily be understood by those skilled in the art.

Figure 8:
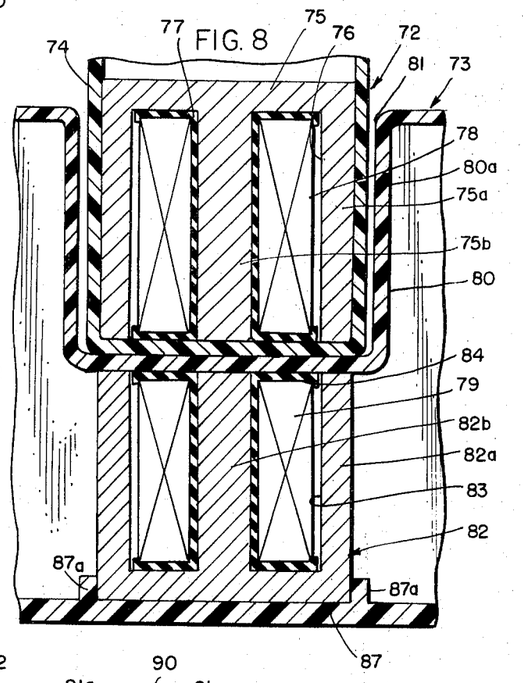
FIG. 8 is a fragmentary sectional view of a power unit and charging unit illustrating still another modification of the present invention.

It will be appreciated that the inductive coupling between the primary winding in a charging unit and a secondary winding in a power unit containing a rechargeable battery may take considerably different forms. In FIG. 8 of the drawings there is illustrated a fragmentary sectional view of a portion of a power unit 72 and an associated charging and storage unit 73. As illustrated, the power unit 72 comprises a casing 74 closed at the bottom similar to the casings 34 and 34' described above. Mounted within the lower end of casing 74 is a magnetic core structure generally designated at 75 comprising a circular inverted cup-shaped portion 75a, having a circular central portion 75b so as to define an annular chamber 76 within the core structure 75. The core structure should be formed of material providing a low reluctance flux path and, to facilitate manufacture, may be constructed of powdered iron or similar material. Disposed within the annular chamber 76 of the secondary core structure 75 is a suitable hollow insulating bobbin 77, preferably formed of nylon or similar insulating material, supporting a secondary winding 78 which functions in the same manner as the secondary windings 19 or 19' described above and would be connected in an electrical circuit similar to that shown in FIG. 6 of the drawings. The center circular portion 75b of the core structure is received within the hollow bobbin 77.

For the purpose of inductively coupling the secondary winding 78 and its core structure with a suitable primary winding designated as 79 and mounted in the storage and charging unit 73 like the winding 18 described above, the latter is provided with a molded housing 80 having a tubular integral wall portion 80a defining a recess 81 closed at the bottom for receiving therein the power unit 72 during a storage and charging operation thereof, the recess 81 functioning like the recess 14 described above. As illustrated, the primary winding 79 is associated with a magnetic core structure designated as 82 which comprises an outer circular cup-shaped portion 82a and a central circular portion 82b defining an annular chamber 83 therebetween for receiving the winding 79. As illustrated, the winding 79 is suitably wound on an insulating bobbin 84.

Preferably the primary winding 79 and its associated core structure 82 are suitably supported within the storage and charging unit 73 on a bottom closure member 87 having integral projections 87a for holding the winding 79 and core structure 82 in a predetermined position closely adjacent the bottom of recess 81, as shown in FIG. 8 of the drawings. The core structures 75 and 82 are such that a flux path of minimum reluctance is produced, the low reluctance path being interrupted only by the thickness of the wall defining the bottom of recess 81 and the thickness of the bottom of casing 74.

In an embodiment employing the construction of FIG. 8 the core structures 75 and 82 each had an outside diameter of one and one-eighth inches, and an over-all length of one inch, with the center core portions 75b and 82b being one-quarter inch in diameter. The wall thicknesses of the portions 75a and 82a were of the order of one-eighth of an inch.

Figure 9:
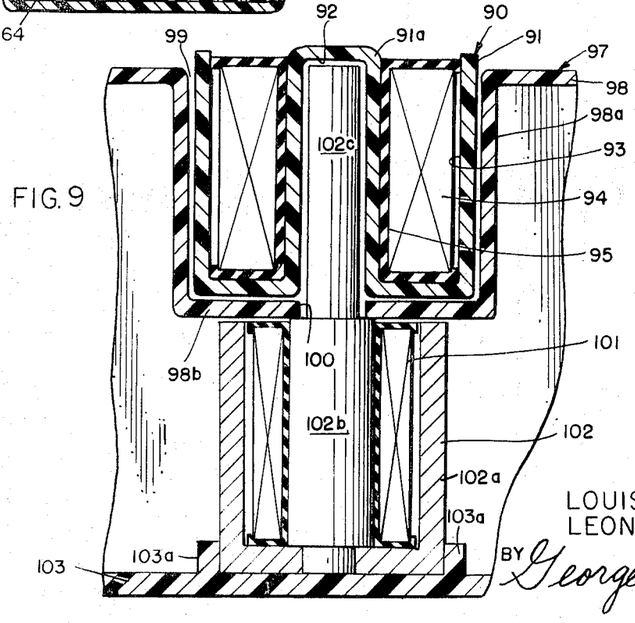
FIG. 9 is a fragmentary sectional view similar to FIG. 8 illustrating still another embodiment of the present invention.

In the embodiments described above, the core structure for the secondary winding was enclosed within the power unit. It might be desirable to eliminate this magnetic structure from the power unit to reduce the weight thereof. In FIG. 9 of the drawings there is illustrated another embodiment of the present invention wherein the core structure for the secondary transformer winding is included in the charging and storage unit rather than in the power unit. The power unit is designated as 90 and comprises a housing or casing 91 closed at the bottom as in all of the preceding embodiments. In this case, however, the bottom of casing 91 is provided with a reentrant portion or reentrant tubular wall structure 91a defining an outwardly opening recess 92 in the lower end of this casing and also defining an annular chamber 93 within the lower end of casing 91 surrounding the reentrant wall portion 91a. A secondary winding 94 suitably mounted on an insulated bobbin is disposed in the chamber 93. This secondary winding is adapted to be connected in the circuit of the power unit in exactly the same way as the winding 19 shown in FIg. 6 of the drawings.

In accordance with the present invention there is provided a storage and charging unit 97 comprising a housing 98 having a tubular wall portion 98a defining a recess 99 for receiving the power unit 90 when it is desired to store the unit and recharge the battery (not shown) contained therein. The bottom of the recess 99 is provided with a wall portion 98b having a central opening 100 defined therein. Suitably supported within the storage and charging unit 97 is a primary winding 101 associated with a core structure 102 including a cup-shaped portion 102a similar to the portion 82a described above, with a long central core portion 102b including a projection 102c adapted to extend a substantial distance beyond the open end of the core structure 102. The core structure 102 may be formed of any suitable material providing a low reluctance flux path, such as some form of iron, or may be fabricated from powdered iron if desired. The winding 101 and core structure 102 are adapted to be mounted within housing 98, preferably supported on a closure plate 103 for the lower open end of housing 98. The closure plate 103 preferably includes projections 103a for supporting the core structure 102 and winding 101 in a predetermined position in housing 98 so that the portion 102c of the core structure extends through the opening 100 and into the recess 99 in concentric relationship therewith.

It will be appreciated that when the power unit 90 is inserted into the recess 99, the core portion 102c will be received in the recess 92 so as to provide good magnetic coupling between the primary winding 101 and the secondary winding 94. It should be understood that the primary winding 101 and the secondary winding 94 are electrically connected in a circuit in substantially the manner of windings 18 and 19, respectively, disclosed in FIG. 6 of the drawings. The diode 28 and the battery for powering of the electric motor 20 will be suitably supported within the casing 92 of the power unit 90 in the manner of the preceding embodiments.

While there have been illustrated and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. A battery operated toothbrush comprising a power unit including a rechargeable battery and a charging unit for association with said power unit during a charging operation of said battery, said power unit including a cylindrical casing closed at one end and of a size capable of being readily held in one hand of the user, a low voltage direct current motor mounted in said casing, a battery and first circuit means in said casing connected selectively to energize said motor from said battery, a first magnetic structure including spaced pole pieces disposed in said casing adjacent said closed end, a first inductive winding wound on said first magnetic structure, a diode and second circuit means in said casing interconnecting said first winding said battery and said diode in a battery charging circuit, said charging unit including means defining a recess for receiving at least the portion of said closed end of said casing enclosing said first magnetic structure, a second magnetic structure mounted in said charging unit including spaced pole pieces having semicircular portions closely embracing the means defining said recess, a second inductive winding associated with said second magnetic structure, the pole pieces of said first and second magnetic structures being similarly spaced whereby said windings are inductively coupled when the closed end of said power unit is disposed in said recess, and means for connecting said second winding to an alternating current source.

2. A battery operated toothbrush comprising a power unit including a rechargeable battery and a charging unit for association with said power unit during a charging operation of said battery, said power unit including a cylindrical casing closed at one end and of a size capable of being readily held in one hand of the user, a low voltage direct current motor mounted in said casing, a battery, first circuit means in said casing connected selectively to energize said motor from said battery, a first magnetic structure including spaced pole pieces interconnected by a tubular member disposed in said casing adjacent said closed end, a first inductive winding wound on said tubular member, said battery being disposed within said tubular member, a diode, second circuit means in said casing interconnecting said first winding said battery and said diode in a battery charging circuit, said charging unit including means defining a recess for receiving at least the portion of said closed end of said casing enclosing said first magnetic structure, a second magnetic structure mounted in said charging unit including spaced pole pieces having portions closely embracing the means defining said recess, a second inductive winding associated with said second magnetic structure, the pole pieces of said first and second magnetic structures being similarly spaced whereby said windings are inductively coupled when the closed end of said power unit is disposed in said recess, and means for connecting said second winding to an alternating current source.

3. A battery operated toothbrush comprising an insulated integral cylindrical casing closed at one end, a rotatable direct current motor and drive mechanism mounted in said casing remote from said closed end with an output shaft projecting from said remote casing end, a concentrically disposed rechargeable battery and secondary transformer winding in said casing adjacent the closed end thereof, means in said casing for interconnecting said secondary winding and said battery in a charging circuit including means for converting alternating current to direct current, and means in said casing for selectively interconnecting said battery and said electric motor, said secondary winding including a magnetic core structure associated therewith at least in part defined by the casing of said battery whereby said secondary winding may readily be inductively coupled with a primary winding disposed outside said casing.

4. In a battery operated toothbrush, the combination of a power unit including a rechargeable battery and a charging unit for association with said power unit during a charging operation of said battery, said power unit including a casing, a direct current electric motor mounted in said casing, a battery and first circuit means in said casing connected selectively to energize said motor, a first inductive winding disposed in said casing, a rectifier and second circuit means in said casing interconnecting said first winding said battery and said rectifier, and a second inductive winding in said charging unit, said charging unit and said power unit being so constructed and arranged that said first and second windings are inductively coupled when said power unit is associated with said charging unit, said battery being surrounded by said first winding and the casing of said battery serving as a flux path for flux linking said first winding.

5. A battery operated toothbrush comprising a power unit including a rechargeable battery and a charging unit for association with said power unit during a charging operation of said battery, said power unit including a cylindrical casing closed at one end and of a size capable of being readily held in the hand of the user, a direct current motor mounted in said casing, a battery and first circuit means in said casing connected selectively to energize said motor from said battery, a first inductive winding disposed in said casing adjacent said closed end, a rectifier and second circuit means in said casing interconnecting said first winding said battery and said rectifier, said charging unit including a housing having means defining a recess for receiving at least the portion of said closed end of said casing enclosing said first inductive winding and a second inductive winding mounted within said charging unit adjacent said recess, means for connecting said second inductive winding to an alternating current source, said units including magnetic structure associated with said windings for automatically inductively coupling said windings when the closed end of said power unit is disposed in said recess whereby said battery may be recharged from said source, said magnetic structure comprising a bobbin in said casing having flanged ends defining secondary pole pieces and a pair of spaced bifurcated primary pole pieces interconnected by a low reluctance core member with the bifurcations thereof closely embracing the means defining said recess, said bifurcated primary pole pieces being spaced apart the same distance as the spacing between said flanged ends, said first winding being disposed on said bobbin and said second winding surrounding said core member.

* * * * *